(12) United States Patent
Kitamura

(10) Patent No.: US 6,988,131 B2
(45) Date of Patent: *Jan. 17, 2006

(54) IMAGING APPARATUS AND NETWORK SYSTEM USING THE SAME

(75) Inventor: Yuji Kitamura, River Edge, NJ (US)

(73) Assignee: Sanyo Electric Co., Ltd. (JP)

( * ) Notice: Subject to any disclaimer, the term of this patent is extended or adjusted under 35 U.S.C. 154(b) by 16 days.

This patent is subject to a terminal disclaimer.

(21) Appl. No.: 10/177,993

(22) Filed: Jun. 21, 2002

(65) Prior Publication Data

US 2002/0156847 A1 Oct. 24, 2002

Related U.S. Application Data

(63) Continuation of application No. 09/207,000, filed on Dec. 7, 1998, now Pat. No. 6,438,587.

(30) Foreign Application Priority Data

Dec. 8, 1997 (JP) .............................. 9-337078

(51) Int. Cl.
*G06F 13/00* (2006.01)

(52) U.S. Cl. ..................... 709/217; 709/245; 709/250
(58) Field of Classification Search ................ 709/203, 709/217, 218, 223, 225, 227, 229, 238, 245, 709/250, 313
See application file for complete search history.

(56) References Cited

U.S. PATENT DOCUMENTS

| 5,526,037 A | 6/1996 | Cortjens et al. |
| 5,606,365 A | 2/1997 | Maurinus et al. |
| 5,689,242 A | 11/1997 | Sims et al. |
| 5,926,209 A | 7/1999 | Glatt |
| 5,956,038 A | 9/1999 | Rekimoto |
| 5,982,362 A * | 11/1999 | Crater et al. ................ 345/327 |
| 6,003,065 A | 12/1999 | Yan et al. |
| 6,020,914 A | 2/2000 | Douhet |
| 6,104,430 A | 8/2000 | Fukuoka |
| 6,115,739 A | 9/2000 | Ogawa et al. |
| 6,122,005 A * | 9/2000 | Sasaki et al. ............... 348/211 |
| 6,151,066 A | 11/2000 | Ito |
| 6,166,729 A * | 12/2000 | Acosta et al. ............... 345/327 |
| 6,266,082 B1 * | 7/2001 | Yonezawa et al. .......... 348/159 |
| 6,414,716 B1 * | 7/2002 | Kawai ........................ 348/211 |
| 6,433,893 B1 * | 8/2002 | Murayama .................. 358/434 |
| 6,654,060 B1 | 11/2003 | Kurosawa et al. |
| 2004/0080625 A1 | 4/2004 | Kurosawa et al. |

FOREIGN PATENT DOCUMENTS

| JP | 7-15646 | 1/1995 |
| JP | 8-317374 | 11/1996 |
| JP | 8-317377 | 11/1996 |
| JP | 9-81781 | 3/1997 |
| JP | 9-288684 | 11/1997 |
| JP | 10-200790 | 7/1998 |

OTHER PUBLICATIONS

Notice of Grounds for Rejection for Japanese Patent Application Serial No. Hei 9–337078 dated Jun. 8, 2004.
Notice of Grounds for Rejection for Patent Application Serial No. 10–1998–0053433 dated Mar. 27, 2003.

(Continued)

*Primary Examiner*—Viet D. Vu
(74) *Attorney, Agent, or Firm*—Cantor Colburn LLP

(57) ABSTRACT

A networked camera includes an I/F circuit so that it can be directly connected to a communication line L of the network. A computer connected to the network can control the imaging operation of the camera independent of any other computer. A desired network address can be attached to image data to send to the communication line L, and image data can be transferred to any other computer or device connected to the communication line L.

8 Claims, 4 Drawing Sheets

OTHER PUBLICATIONS

Office Action for U.S. Appl. No. 10/177,468 dated Dec. 2, 2002.

Office Action for U.S. Appl. No. 10/177,468 dated Jan. 21, 2004.

Notice of Grounds for Rejection for Japanese Patent Application Serial No. 2002-066622 dated Jun. 8, 2004.

Copy of Office Action issued on Feb. 22, 2005 for the corresponding Korean application No. 10-2004-0062748 (English translation included).

Copy of Final Office Action issued on Feb. 25, 2005 for the corresponding Korean application No. 10-1998-0053433 (English translation included).

* cited by examiner

RECEIVED DATA | HEADER | USER DATA (CONTROL COMMAND)

TRANSMITTED DATA | HEADER | USER DATA (IMAGE INFORMATION)

IMAGING APPARATUS AND NETWORK SYSTEM USING THE SAME

CROSS-REFERENCE TO RELATED APPLICATIONS

This application is a continuation application of U.S. patent application Ser. No. 09/207,000, filed on Dec. 7, 1998, now U.S. Pat. No. 6,438,587, which is herein incorporated by reference in its entirety.

BACKGROUND OF THE INVENTION

Since the establishment of a networked computing, a variety of image data is now frequently transmitted among a plurality of computers. Accordingly, demand for capturing various image data for the computers is increasing. Generally, when image information is taken into a personal computer, an add-in video capture board is mounted on the computer, and image information supplied through a video camera or electronic still camera connected to the add-in board is converted into a predetermined data format before sent to the computer. Image data captured by the computer is temporarily stored in the internal storage device and can be transmitted to other computer equipment through the network as required.

FIG. 1 is a schematic diagram showing an example configuration of a network system. This drawing shows a client/server type network system.

Communication line L comprises a coaxial, twisted pair, or fiber optic cable. A server C0 and a plurality of clients C1 to C5 are connected to the communication line L. The server C0 performs a variety of processing in response to requirements from the clients C1 to C5 and also manages operation of the network system as a whole. The clients C1 to C5 operate independently and transfer a variety of data to/from the server C0 or another one or more of the clients C1 to C5 as required.

The server C0 and the clients C1 to C5 are given respective unique network addresses, and the server C0 or the clients C1 to C5 are configured so to be mutually identifiable based on these network addresses. Each of the clients C1 to C5 can share data or a variety of hardware with the server C0 or another one or more of the clients C1 to C5.

The clients C1, C4 have respective cameras V1, V2 as input device of image data so to enable capturing image data. Image data taken into the clients C1, C4 through the cameras V1, V2 is temporarily stored in a storage device such as a hard disk in the clients C1, C4. The image data is transferred to any of the clients C1 to C5 or the server C0 as desired in response to a transfer requirement from any one of the clients C1 to C5. The image data is transferred on a picture-by-picture basis, or in units of divided blocks of each picture, according to the communication protocol of the network system.

Where it is determined that cameras V1, V2 will be shared over the network, the clients C2, C3, C5 not having the cameras V1, V2 can control the cameras V1, V2 via the clients C1, C4. Image data is transferred in the same way as above, either on a picture-by-picture basis, or in units of divided blocks, again, according to the network communication protocol.

FIG. 2 is a block diagram showing the configuration of a video capture for capturing image information taken into a client (personal computer) by an electronic camera. The drawing shows that the image information is output as digital data (image data) from the electronic camera.

A capture board 10 comprises a frame memory 1, a synchronism detecting circuit 2, a timing control circuit 3, and an interface circuit 4, and is connected between the electronic camera and a client. The frame memory 1 stores image data, input through the electronic camera on a picture-by-picture basis. This frame memory 1 has sufficient capacity to store a number of pictures according to a ratio between an input rate of image data from the electronic camera and a transfer rate of image data to the client. The synchronism detecting circuit 2 detects a synchronism component contained in the image data entered from the electronic camera and generates a timing pulse corresponding to each timing of vertical scanning and horizontal scanning. The timing control circuit 3 controls timing of writing and reading image data into and from the frame memory 1 based on the timing pulse supplied from the synchronism detecting circuit 2 and directions from the client.

An interface (I/F) circuit 4 is connected between the frame memory 1 and the client and transfers image data read from the frame memory 1 to the client according to the instructions given by the timing control circuit 3. The interface circuit 4 sends interrupt instructions being output from the timing control circuit 3 to the client, receives a control command sent out from the client, and then gives instructions to the timing control circuit 3. Thus, the image data input from the electronic camera on a picture-by-picture basis is stored in the frame memory 1 on a picture-by-picture basis and also taken into the client on a picture-by-picture basis in response to a request from the client.

Control programs corresponding to the cameras V1, V2 and their video captures are installed in the clients C1, C4 connected with the cameras V1, V2. The cameras V1, V2 are connected to the clients C1, C4 and can only be controlled by the clients C1, C4. When the clients C2, C3, C5 to which the cameras V1, V2 are not connected, wish to capture image data using the cameras V1, V2, image data must first be sent to the clients C1, C4 which are connected with the cameras V1, V2 before it can be transferred from the clients C1, C4 to the clients C2, C3, C5. Where the cameras V1, V2 are shared on the network, the control programs are installed in the clients C2, C3, C5, so that the cameras V1, V2 can be controlled from the clients C2, C3, C5 of the network via the clients C1, C4.

In such a network, the cameras V1, V2 are connected to the communication line L via respective clients C1, C4. In other words, the clients C1, C4 are necessary in order to connect the cameras V1, V2 to the network. If the clients C1, C4 connected with the cameras V1, V2 are not turned on, the operation of the cameras V1, V2 cannot be controlled, regardless of the control programs installed in the other clients C2, C3, C5. Therefore, topological placement of the cameras V1, V2 is limited to the neighborhood of the clients C1, C4, and their versatility is lowered. As a result, the cost of the network system increases.

SUMMARY OF THE INVENTION

A display device, which can directly connect to a network including: an interface circuit, which is connected to a communication line through which an information packet including image information and control information is transmitted, and which fetches the information packet from the communication line; an image signal processing circuit for producing image signals based on the image information contained in the information packet; a control circuit for controlling operation of the image signal processing circuit according to the control information contained in the information packet; and a display panel for displaying image based on the image signals.

DETAILED DESCRIPTION OF THE PREFERRED EMBODIMENT

Figures 3, 4:
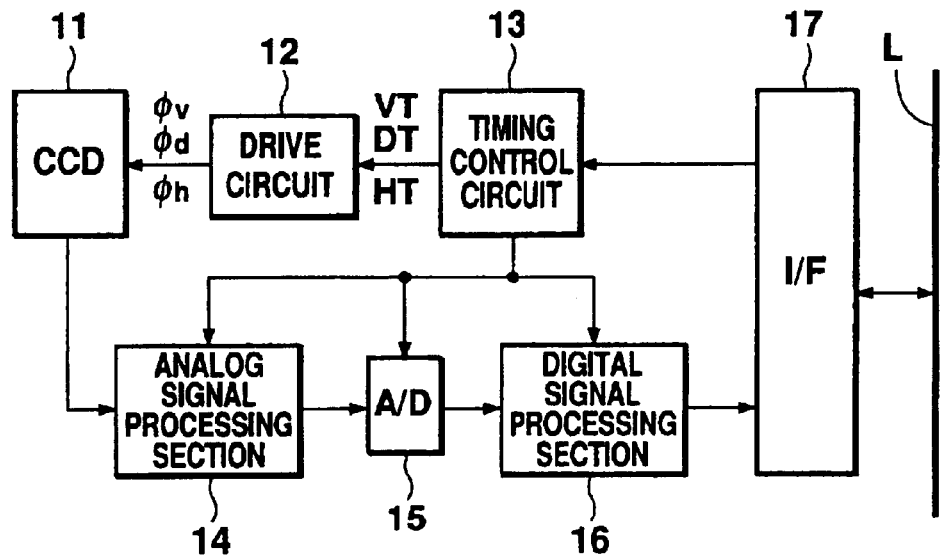
FIG. 3 is a block diagram showing the configuration of an imaging apparatus according to the present invention.
FIG. 4 is a diagram showing formats of received data and transmitted data for the imaging apparatus of the present invention.

FIG. 3 is a block diagram showing the configuration of a solid-state imaging device according to the present invention. FIG. 4 is a diagram showing the configuration of an information packet.

A CCD image sensor 11 as the imaging device has a plurality of light receiving pixels arranged in rows and columns on a light receiving face, and accumulates information charges generated in response to irradiated light in the light receiving pixels. A color filter, e.g., a mosaic filter, is fitted to the light receiving face of the CCD image sensor 11. The light receiving pixels are associated with specific color components by the color filter. A drive circuit 12 generates a polyphase clock pulse according to timing signals of horizontal and vertical scanning supplied from a timing control circuit 13 (control circuit) and transfers information charges to be accumulated in each light receiving pixel of the CCD image sensor 11 in predetermined order. The transferred information charge is converted into a voltage value at the output of the CCD image sensor 11 and are output as an image signal corresponding to an amount of information charges accumulated in each light receiving pixel. The imaging device used as the imaging apparatus can be a variety of solid state devices, such as a MOS sensor or a pickup tube in addition to the CCD image sensor.

An analog signal processing section 14 performs sample hold, gain control, or other processing on the image signal input from the CCD image sensor 11 and outputs an image signal in compliance with a predetermined format. For example, in the sample hold, a difference between a standard level and a signal level which are alternately repeated in the output of the CCD image sensor 11 is taken out as the image signal, while, in the gain control, a gain with respect to the image signal is adjusted so to place the average level of one picture into a predetermined appropriate range. An analog/digital (A/D) conversion circuit performs A/D conversion of the image signal entered from the analog signal processing section 14 in synchronization with the output operation of the CCD image sensor 11 to generate digital image data corresponding to each light receiving pixel of the CCD image sensor 1.

A digital signal processing section 16 performs separation of color components, matrix computation, or the like on the image data entered from the A/D conversion circuit 15 to generate luminance data indicating luminance information, and color-difference data indicating color information. The digital signal processing section 16 compresses the generated luminance data and color-difference data according to a predetermined algorithm to generate compressed image data. For example, when JPEG (Joint Photographic Experts Group) algorithm is applied, one picture is divided into blocks of 8×8 pixels, and each block is subjected to DCT (Discrete Cosine Transform) conversion, quantizing, and coding.

An interface (I/F) circuit 17 captures an information packet transmitted over the communication line L and supplies the timing control circuit 113 with control information retrieved from the information packet. The I/F circuit 17 is assigned a network address which is unique within the network and is configured to detect a match between the network address and a receiver address to be attached to the information packet on the communication line L so to capture the information packet. The I/F circuit 17 converts the compressed image data received from the digital signal processing circuit 16 into a format conforming with a communication protocol, and sends it to the communication line L. At that point, the I/F circuit 17 stores that address and also the address of the receiver of the information packet into the header of the information packet. One or more clients (personal computers) are connected to the communication line L and, based on the network address allocated thereto, a predetermined client can access the imaging apparatus.

Received data captured from the communication line L, and transmitted data sent to the communication line L by the I/F circuit consist of header and user data which are respectively put into a predetermined byte count as shown in FIG. 4. The header of the received data contains the address (sender address) of the client accessing to the imaging apparatus and the address (receiver address) of the imaging apparatus itself, while the user data contains a control command for controlling the operation of the imaging apparatus. The header of the transmitted data contains the address (receiver address) of one or more clients receiving the image data and the address (sender address) of the imaging apparatus itself, while the user data contains the image information. Thus, the information packet transmitted from the client is captured as received data into the imaging apparatus, and the operation of the imaging apparatus is controlled based on the control command contained in the received data. The image data obtained by the imaging operation is sent to one or more clients. The image data can be sent back to the sender address contained in the header of the received data, or any one or more addresses instructed by the control command contained in the user data can be specified.

Figure 5:
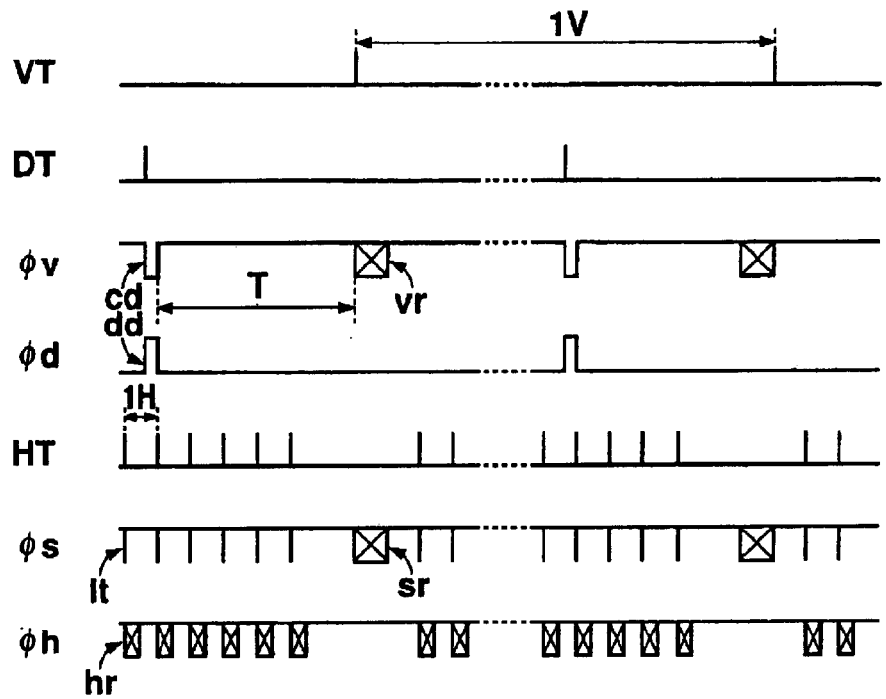
FIG. 5 is a timing chart illustrating the operation of the imaging apparatus of the present invention.

FIG. 5 is a timing chart illustrating an example operation 15 of the imaging apparatus of the present invention. The CCD image sensor 11 is a frame transfer CCD image sensor having an image pickup section, which has a plurality of light-receiving pixels arranged in matrix, and a storage section, which has a plurality of storage pixels arranged in matrix in correspondence with the light-receiving pixels of the image pickup section.

Vertical scanning timing signal VT sets the timing of vertical scanning of the CCD image sensor 11, and horizontal scanning timing signal HT sets the timing of horizontal scanning. In this embodiment, each timing of vertical scanning and horizontal scanning is set in a predetermined cycle, one cycle of vertical scanning timing signal VT becomes one vertical scanning period (1V), and one cycle of horizontal scanning timing signal HT becomes one horizontal scanning period (1H). Vertical scanning timing signal VT and horizontal scanning timing signal HT are generated in the timing control circuit 13 based on the control command taken into the I/F circuit 17 and a reference clock in a predetermined cycle. Discharge timing signal DT sets timing of operation to discharge information charges accumulated in each light receiving pixel of the CCD image sensor 11 on the midpoint of one vertical scanning period. This discharge timing signal DT is also generated in the timing control circuit 13 based on the control command to be loaded into the I/F circuit 17.

Vertical transfer clock Ø v generates a discharge pulse cd with a predetermined time width in response to the discharge timing signal DT, and generates readout pulse series vr corresponding in number to the number of vertical pixels of the CCD image sensor 11 in response to the vertical scanning timing signal VT. A discharge clock Ø d generates a discharge pulse dd having a predetermined time width in response to the discharge timing signal DT. This discharge pulse dd has the same time width as the discharge pulse cd of the readout drive clock Ø v. In the image pickup section of the CCD image sensor 11, the information charges accumulated in the respective light receiving pixels are discharged by the action of the respective discharge pulses cd, dd. For example, the discharge clock Ø d is applied to a drain for absorbing excessive electric charges disposed next to each light receiving pixel, and the vertical transfer clock Ø v is applied to an electrode for controlling the accumulation of the information charges to achieve the operation to discharge the information charges, namely an electronic shutter operation. In the image pickup section and the accumulation section of the CCD image sensor 11, the information charges accumulated in each light receiving pixel are transferred to the storage pixels of the storage section by the action of the readout pulse series vr and a readout pulse series sr to be described afterward. Thus, the information charges accumulated in the respective light receiving pixels in a period T from the termination of the discharge pulses cd, dd to the start of the readout pulse series vr are stored in the respective storage pixels of the storage section.

Storage transfer clock Ø s generates the readout pulse series sr corresponding with the readout pulse series vr of the vertical transfer clock Ø v and also generates a line-feed pulse lt in response to the horizontal scanning timing signal HT. And, a horizontal transfer clock Ø h generates the readout pulse series hr corresponding to the number of horizontal pixels of the CCD image sensor 11 in response to the vertical scanning timing signal HT. The information charges stored in the storage section of the CCD image sensor 11 are read line by line to the horizontal transfer section adjacent to the storage section by the action of the line-teed pulse lt. The information charges for one line are read in series by the action of the readout pulse series hr. Thus, the image signals successive line by line are output from the CCD image sensor 11.

In the operation of the CCD image sensor 11, the control command supplied from the I/F circuit 17 to the timing control circuit 13 can set a cycle of the vertical scanning timing signal VT, timing of the generation of the discharge timing signal DT and the like. For example, the number of pictures per unit time (frame rate) is set according to the cycle of the vertical scanning timing signal VT, and accumulation time (exposure time) of the information charges of the light receiving pixels is set according to a phase difference of the discharge timing signal DT with respect to the vertical scanning timing signal VT. The image signal output from the CCD image sensor 11 is subjected to prescribed signal processing with timing in synchronization with the output operation of the CCD image sensor 11 in the analog signal processing circuit 14, and is converted into image data by the A/D converter 15 and input into the digital signal processing circuit 16. The image data is compressed by the digital signal processing circuit 16 and input into the I/F circuit 17. In the processing operation of the digital signal processing circuit 16, the control command can set compression processing conditions, such as a compressing method and a compression rate.

The image data input into the I/F circuit 17 is divided at a predetermined byte count corresponding to the communication protocol of the network and attached headers indicating the receiver address and its own address to form an information packet. In forming the information packet, the control command can set the format of the information packet and each address of the receivers.

Using the imaging apparatus described above, a direct connection to the communication line L can be made without involving other clients, the operation can be controlled from any client on the network, and the image data can be transmitted to any client.

Figure 6:
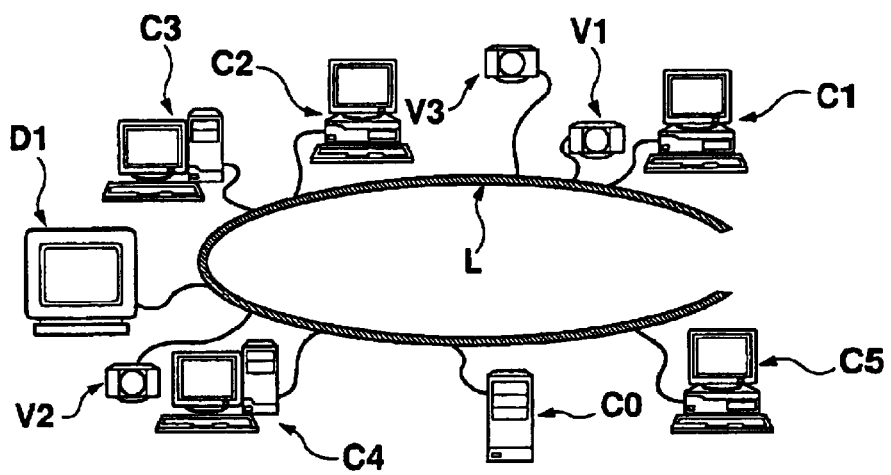
FIG. 6 is a schematic diagram showing the configuration of a network system according to the present invention.

FIG. 6 is a schematic diagram showing the configuration of the network system according to the present invention. It shows an example of the same client/server type network similar to the one shown in FIG. 1.

Communication line L may be formed of a coaxial, twisted pair, or fiber optic cable. A server C0, a plurality of clients C1 to C5, and a plurality of cameras V1 to V3 are connected to the communication line L. A display D1 having a built-in interface is also connected to the communication line L.

Figure 1:
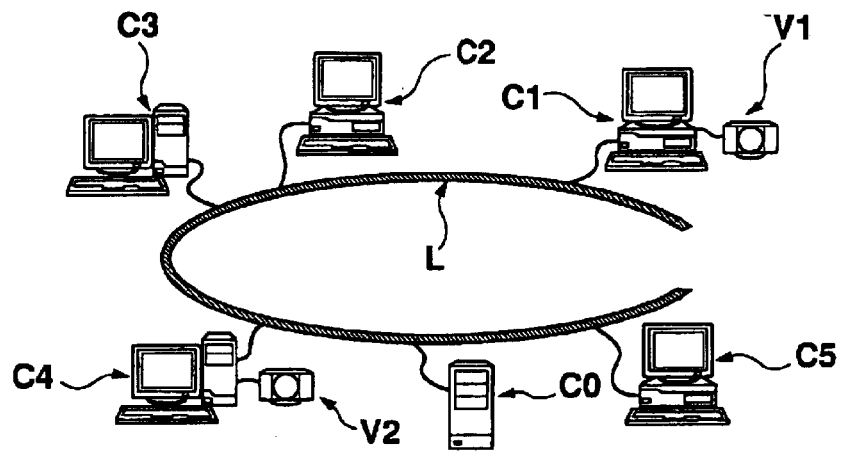
FIG. 1 is a schematic diagram showing the configuration of a conventional network system.
Figure 2:
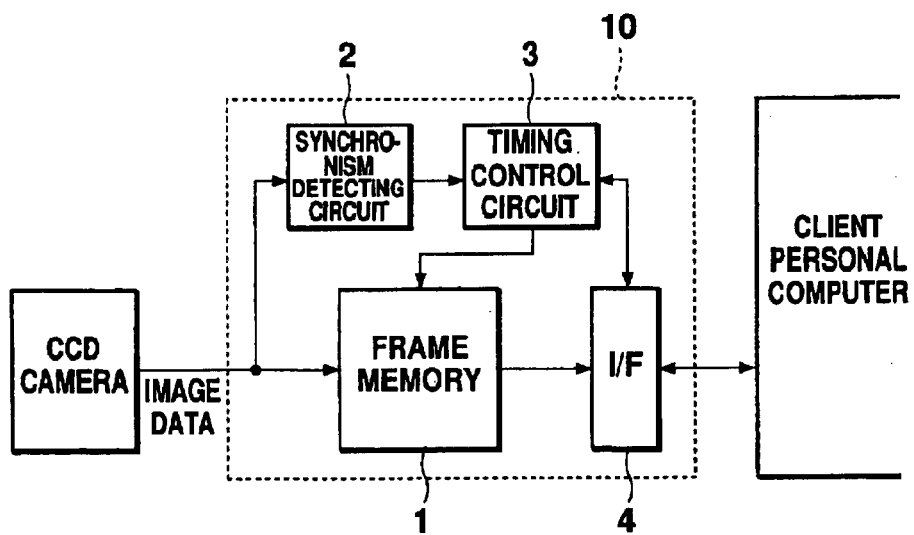
FIG. 2 is a block diagram showing the configuration of video capture.

The server C0 performs requested processes in response to the requirements of any of the clients C1 to C5 in the same manner as in FIG. 1, and also manages the network as the whole. The respective clients C1 to C5 operate independently and give to or receive from the server C0 a variety of data as required. The cameras V1 to V3 are configured as shown in FIG. 3 and send image data of pickup images to the communication line L in a predetermined information packet units. The display D1 as a display device has a network interface therein and captures the image data, which is transmitted from the cameras V1 through V3 in response to instructions given by the clients C1 to C5 or the server C0, to display it picture by picture.

Inherent unique network addresses are allotted to the server C0, the respective clients C1 to C5, the cameras V1 to V3, and the display D1. The network address is used to designate any of the server C0, the respective clients C1 to C5, the cameras V1 to V3 and the display D1. Thus, any clients C1 to C5 can make a request to the server C0 or any other clients C1 to C5 for the transfer of desired data, control the cameras V1 to V3 for the image pickup operation and request the transfer of image data. The clients C1 to C5 can also control the remotely located display D1 to transfer image data from the cameras V1 through V3 in order to display. In the network system described above, all of the clients C1 to C5 can access the cameras V1 to V3 because the cameras V1 to V3 are connected in parallel with the clients C1 to C5. The clients C1 to C5 can also remotely control the display D1 positioned at any location, because the display D1 is connected in parallel with the clients C1 to C5 in the same manner as the cameras V1 to V3.

Figure 7:
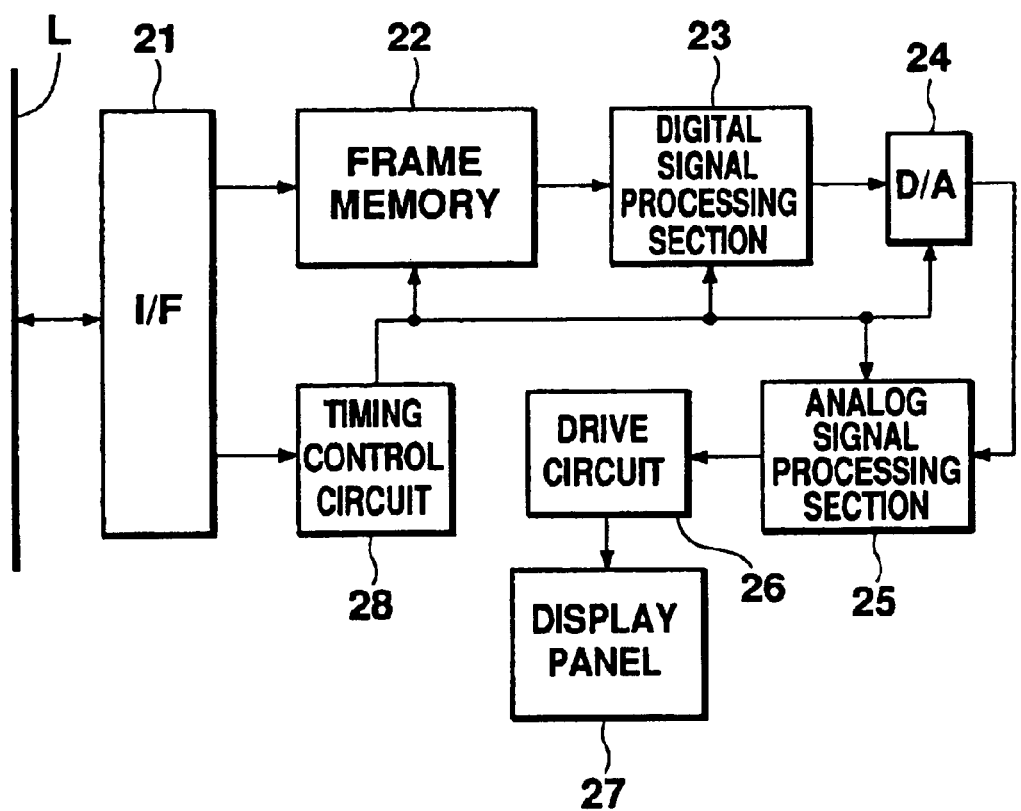
FIG. 7 is a block diagram showing the configuration of a display used for the network system of the present invention.

FIG. 7 is a block diagram showing the configuration of the display D1 as a display device used for the network system of the invention. The display D1 is characterized in that it comprises a network interface therein.

An interface (I/F) circuit 21 is allocated a unique network address on the network in the same manner as the I/F circuit 17 shown in FIG. 3, and detects a match between this network address and a receiver address to be attached to the information packet so to capture the information packet. The information packet contains image data showing images and control data showing a variety of control commands. The image data is supplied to a frame memory 22, while the control data is supplied to a timing control circuit 28 (control circuit).

The frame memory 22, with sufficient capacity to store image data for an appropriate number of frames, stores successively image data input from the I/F circuit 21, and reads the stored image data with predetermined timing to supply to a digital signal processing section 23. The digital signal processing section 23 performs pixel density conversion, error dispersion, or the like on the image data input from the frame memory 22. If the image data is compressed, the digital signal processing section 23 performs decompression appropriate to the compression method, and converts a data array so to correspond with a display system. For example, where image data is compressed according to JPEG, the compressed image data is subjected to decompression, reverse quantization, and IDCT (Inversed Discrete Cosine Transform) conversion to generate decomposed image data in units of 8×8 pixels.

A D/A conversion circuit 24 converts the image data supplied from the digital signal processing section 23 into an analog value in order to generate an image signal. An analog signal processing section 25 performs distortion compensation, blanking, and the like of the image signal input from the D/A conversion circuit 24 to generate an image signal conforming to a predetermined format. A drive circuit 26 supplies an LCD panel 27 with the image signal input from the analog signal processing section 25 with timing according to a variety of synchronization signals supplied from the timing control circuit 28. The LCD panel 27 as a display device has a plurality of display pixels arranged in a matrix and displays images according to the image signals on the respective display pixels. The display device is not limited to the LCD panel, but can be another display device such as CRT or plasma display.

The timing control circuit 28 generates a synchronization signal for the LCD panel 27 to supply to the drive circuit according to the control data input from the I/F circuit 21 and supplies a variety of timing signals in synchronization with the synchronization signal to the respective sections 22 to 25 so to synchronize their operations. The timing control circuit 28 gives directions for signal processing conditions to the digital signal processing section 23 and the analog signal processing section 25 according to a variety of signal processing conditions instructed by the control data. For example, a compression mode of image data and a frame rate are designated such that the image data can be decomposed properly and displayed in a predetermined cycle.

The above-described display device can be directly connected to the communication line L to display the image data supplied from the clients or the imaging apparatus. The display device can be placed at any location, regardless of the locations of the clients.

Although the above examples described a client/server type network, the invention can also be easily applied to other network types, such as a peer-to-peer type network. Where a plurality of networks are mutually connected by means of a bridge or gateway, the computers connected between different networks and the imaging apparatus can be connected through a plurality of networks.

The imaging apparatus of the present invention can be connected directly to the communication line of the network, and its imaging operation can be controlled by the clients through the network. According to the network system of the invention, one or more clients connected to the communication line of the network can control the imaging operation as desired and transfer image data with one or more cameras or a display also connected in parallel with the communication line.

Where the communication line of the network is located available to connect a camera or a display, the camera or the display can be placed independently to control the operation from the remotely placed clients, and image data can be supplied to any client. For example, when an IP address is given to a camera on the Internet, any terminal connected to the Internet can potentially access that camera.

Thus, general versatility of the imaging apparatus is expanded, and the network system is simplified and its cost reduction can be expected.

While there has been described that what is at present considered to be a preferred embodiment of the invention, it is to be understood that various modifications may be made thereto, and it is intended that the appended claims cover all such modifications as fall within the true spirit and scope of the invention.

What is claimed is:

1. A display device, which can directly connect to a network comprising:

an interface circuit, which is connected to a communication line through which an information packet including image information and control information is transmitted, and which fetches said information packet from said communication line;

an image signal processing circuit for producing image signals based on the image information contained in said information packet and being operable based solely on the control information contained in said information packet from said interface circuit;

a control circuit connecting to said interface circuit for controlling operation of said image signal processing circuit according to the control information contained in said information packet provided from said interface circuit; and a display panel for displaying image based on said image signals produced by said image signal processing circuit.

2. The display device according to claim 1, wherein said interface circuit, to which is assigned an inherent address unique within the network, detects a match between the inherent address and an address indicated by address information attached to the information packet transmitted over the communication line to permit capturing of the information packet.

3. The display device according to claim 2, further comprising a frame memory, which is connected to said interface circuit and stores at least one frame of said image information contained in said information packet which is provided form said interface circuit.

4. A network system comprising:

a communication line for transmitting an information packet including image information and control information;

at least one terminal device, connected to said communication line, which generates said information packet in which a receiver address is attached to said image information, and sends out the generated information packet to said communication line; and a display device, directly connected to said communication line, which fetches and displays said information packet sent through said communication line according to the address information attached to said image information;

wherein said display device includes an interface circuit which fetches said information packet from said communication line, to which is assigned an inherent address unique within the network, which detects a match between the inherent address and the address indicated by address information attached to the information packet transmitted through said communication line to permit capturing of the information packet, wherein said display device further includes a control circuit connecting to said interface circuit for controlling operation of said display device according to said control information provided from said interface circuit, and said display device being openable based on the control information contained in the information packet provided from the interface circuit.

5. The network system according to claim 4, wherein one or more of said terminal devices each having a unique address and one or more of said display devices each having a unique address are connected in parallel to said communication line and said information packet is transmitted between one of the terminal devices and one of the display device biased on said address.

6. A network system comprising:

a communication line for transmitting an information packet including image information and control information;

at least one terminal device, connected to said communication line, which generates said information packet in which a receiver address is attached to said image information, and sends out the generated information packet to said communication line; and a display device, connected to said communication line, which fetches and displays said information packet sent through said communication line according to the address information attached to said image information;

wherein said display device includes an interface circuit, which is connected to a communication line through which an information packet including image information and control information is transmitted, and which fetches said information packet from said communication line, and an image signal processing circuit for producing image signals based on the image information contained in said information packet and being operable based solely on the control information contained in said information packet from said interface circuit.

7. The network system according to claim 6, further comprising a control circuit connecting to said interface circuit for controlling operation of said image signal processing circuit according to the control information contained in said information packet provided from said interface circuit.

8. The network system according to claim 6, wherein one or more of said terminal devices each having a unique address and one or more of said display devices each having a unique address are connected in parallel to said communication line and said information packet is transmitted between one of the terminal devices and one of the display device based on said address.

* * * * *